United States Patent
Lynch

[11] 3,731,988
[45] May 8, 1973

[54] MAGNIFYING LENS DEVICES

[76] Inventor: Robert D. Lynch, 3520 Fifth Avenue, Los Angeles, Calif. 90018

[22] Filed: Aug. 27, 1971

[21] Appl. No.: 175,499

[52] U.S. Cl. ............... 350/188, 350/190, 350/241, 350/256
[51] Int. Cl. ..................... G02b 3/06, G02b 25/00
[58] Field of Search ............. 350/188, 190, 256, 350/175, 114, 116, 241

[56] References Cited

UNITED STATES PATENTS

| | | |
|---|---|---|
| 3,387,693 | 6/1968 | Wirth ........................ 350/188 X |
| 2,586,581 | 2/1952 | Tschischeck ............... 350/190 UX |
| 874,049 | 12/1907 | Borsch ........................ 350/175 R X |
| 2,026,176 | 12/1935 | Jaeckel ....................... 350/175 R X |
| 3,529,117 | 9/1970 | Costello ..................... 350/190 X |
| 2,166,988 | 7/1939 | Fosdick ...................... 350/191 UX |

FOREIGN PATENTS OR APPLICATIONS

| | | |
|---|---|---|
| 1,137,058 | 1/1957 | France ........................ 350/175 R |

*Primary Examiner*—John K. Corbin
*Attorney*—Spensley, Horn & Lubitz

[57] ABSTRACT

Magnifying devices for magnifying newsprint and the like having a generally cylindrical shape with one or more flattened areas parallel to the axis of the cylinder. The magnifying devices are of a transparent material with smooth and clear cylindrical surfaces and with at least one flattened surface having a frosted like appearance. The magnifying devices are used by placing the frosted surface against the newsprint or similar matter to be magnified and the magnified matter is viewed through one of the clear cylindrical surfaces. The frosted surface does not affect the visual appearance of the matter being magnified and creates a magnifying device of interesting physical appearance which is not readily observably scratched on the frosted surface. An alternate shape utilizing such a frosted surface is also disclosed.

5 Claims, 11 Drawing Figures

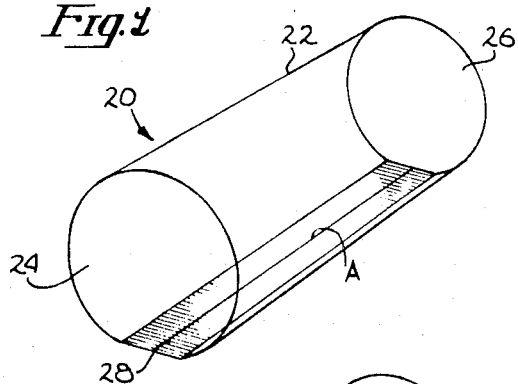
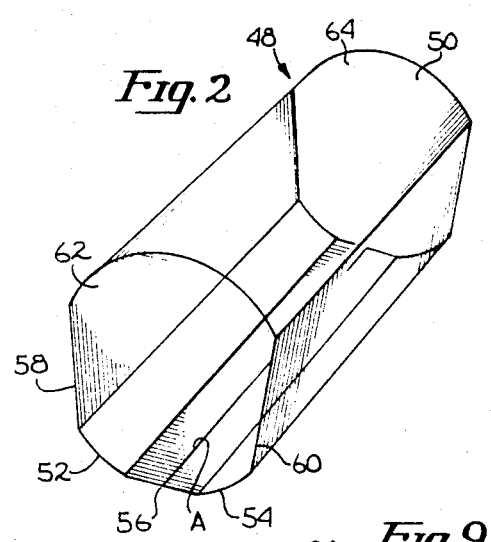
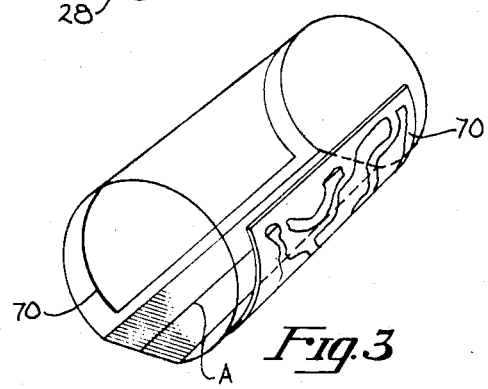
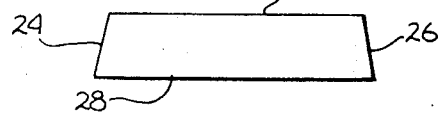
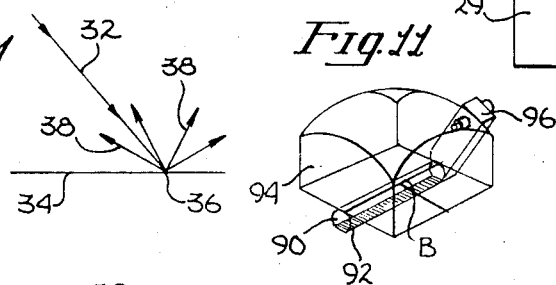
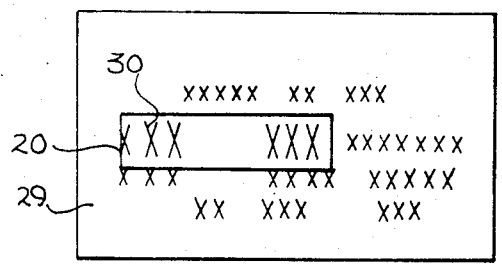
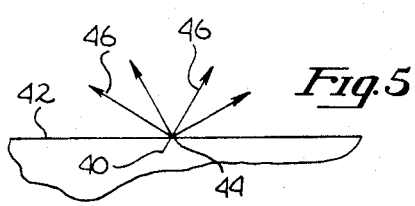
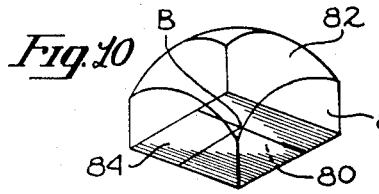
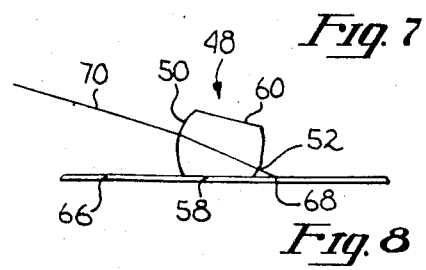
ROBERT D. LYNCH
INVENTOR.
BY Spensley, Horn & Lubitz
ATTORNEYS

MAGNIFYING LENS DEVICES

BACKGROUND OF THE INVENTION

1. Field of the Invention

This invention relates to the field of magnifying devices.

2. Prior Art

Various types of magnifying devices suitable for magnifying newsprint and the like are well-known in the prior art. Such devices include devices having some form of spherical lens surface, and clear cylindrical devices which, when placed over the print to be magnified and viewed through the side thereof, serve as magnifying devices.

The spherical lens devices are well-suited for the magnification of a small area or of a small object since they give a substantially equal two-dimensional magnification. However, they are not well-suited for the magnification of newsprint and the like since the magnifying device for such a use must be steadily moved along a line of newsprint, rather than simply down from line to line, and the apparent speed of motion of the magnified print is itself magnified over the actual speed at which the magnifying device is moved along the print. Thus, such devices are difficult to use for reading purposes because the device must be moved to scan each word of the print and because of the apparent motion of the magnified print when viewed through the magnifying device.

Cylindrical magnifying devices are better suited for magnifying newsprint and the like since the words in one or more lines may be magnified without moving the magnifying device. Such magnifying devices may be in the form of fully round cylinders or cylinders having a flattened surface which is substantially parallel to the axis of the cylinder. To magnify newsprint and the like, the magnifying device is placed along the line to be magnified with the flattened surface, if any, lying flat against the matter to be magnified. By viewing the matter to be magnified through the cylindrical surface of the magnifying device, a magnification in a direction perpendicular to the axis of the magnifying device is obtained. Though this magnification is a one-dimensional magnification, that is, the length of the newsprint in the line being magnified is not magnified, but only the height of the print is magnified, the newsprint is substantially easier to read as a result thereof. Also, since an entire line may by magnified without moving the magnifying device, horizontal motion of the magnifying device is not required and, similarly, there is no apparent horizontal motion of the magnified material as a result of motion of the magnifying device. Furthermore, since there is no horizontal magnification of the print being viewed, the horizontal sweep of the eyes of the reader required to cover a line of the print is the same as it would be if no magnifying device were used.

Magnifying devices comprising a cylindrical bar without a flattened surface parallel to the axis thereof are not as easy to use as those having a flattened surface thereon since the cylindrical device will tend to roll rather than to remain stationery when placed in position on a generally flat surface. Therefore, one can flatten a surface parallel to the axis of the cylinder and place the flattened surface on the material to be magnified. This tends to keep the magnifying device from rolling and makes the magnifying device easier to use without substantially detracting from its magnifying properties.

With respect to cylindrical magnifying devices having a flattened surface thereon, or of spherical lens devices having a flattened surface thereon, one would normally polish the flattened surface, so that, with the possible exception of the ends or sides, the surfaces of the device are all polished surfaces. However, since the magnifying device is almost always resting on the flattened surface and is generally slid along a desk top or the material to be magnified on the flattened surface, this surface tends to accumulate a number of small scratches. These scratches, which are generally of random orientation on the flattened surface, tend to detract from the physical appearance of the magnifying device. Also, since cylindrical magnifying devices are often fabricated by cutting a cylindrical bar, a separate polishing operation is required to polish the flattened surface in order to complete the fabrication of the prior art magnifying device.

BRIEF SUMMARY OF THE INVENTION

Magnifying devices for magnifying newsprint and the like which, in the preferred embodiment have a generally cylindrical shape with one or more flattened areas parallel to the axis of the cylinder. The magnifying devices are of a transparent material, lucite being used in a preferred embodiment, with smooth and clear cylindrical surfaces and at least one flattened surface having a frosted like appearance. The magnifying devices are used by placing the frosted surface against newsprint or similar matter to be magnified, and the magnified matter is viewed through one of the clear cylindrical surfaces. The frosted surface does not affect the visual appearance of the matter being magnified and creates a magnifying device of interesting physical appearance which is not readily observably scratched on the frosted surface.

In the preferred embodiment, the ends of the magnifying device are purposely cut so as to be substantially non-parallel, with the longest surface of the magnifying device being the frosted surface. Thus, when the magnifying device is placed in position over the material to be magnified and is appropriately viewed, the flat ends of the magnifying device are generally not observable. In an alternate embodiment, two additional flattened surfaces, one on each side of the magnifying device, are provided so that the magnifying device may be placed on one of these additional flattened surfaces and viewed from the side. In this embodiment the two additional flattened surfaces do not serve as viewing surfaces. A further alternate embodiment uses decorative plastic strips on each side of the magnifying device. These strips, while being decorative, are also functional in that they restrict the vision in the area of the magnifying device which may otherwise provide a very distorted view of the matter being magnified. A still further embodiment uses a frosted surface, as hereinbefore described, a magnifying device having a spherical upper surface.

BRIEF DESCRIPTION OF THE DRAWINGS

FIG. 1 is a perspective view of one embodiment of the magnifying device of the present invention.

FIG. 2 is a perspective view of an alternate embodiment of the magnifying device of the present invention.

FIG. 3 is the further alternate embodiment of the magnifying device of the present invention.

FIG. 4 is a schematic representation of the reflection of light from a non-glossy surface.

FIG. 5 is the schematic representation of light passing throuh a frosted surface.

FIG. 6 is the top view of the magnifying device of FIG. 1 on a sheet of print.

FIG. 7 is a perspective view of the magnifying device of FIG. 2 in a position for magnifying print, therebelow.

FIG. 8 is a view taken along lines 8—8 of FIG. 7 illustrating the passage of light rays through the magnifying device 48 when used in the position shown in FIG. 7.

FIG. 9 is a side view of the magnifying device of FIG. 1 illustrating the nonparallelism of the ends thereof.

FIG. 10 is a perspective view of a further alternate embodiment of the present invention.

FIG. 11 is a perspective view of a still further alternate embodiment of the present invention.

DETAILED DESCRIPTION OF THE INVENTION

First referring to FIG. 1, a perspective view of one embodiment of the present invention may be seen. In this embodiment, magnifying device 20 is comprised of a cylinder of transparent material having a cylindrical surface 22, ends 24 and 26, and a flattened surface 28 substantially parallel to the axis of the cylindrical surface 22. The flattened surface 20 is a roughened or frosted surface so as to substantially diffuse light passing therethrough, while the cylindrical surface 22 is a substantially polished cylindrical surface, (the word "frosted" as used herein, is used in the general sense to indicate a roughened surface as may be created by machining, sandblasting and the like). The ends 24 and 26 may be polished or may be left in a roughened state since they do not serve as a functional part of the magnifying device. In this regard, it is generally easier (and more decorative) to leave the ends 24 and 26 in a roughened state if the magnifying device is cut from a cylindrical bar of transparent material.

Now referring to FIG. 6, a simulated page of print 29 with the magnifying device of 20 of FIG. 1 in position thereon, may be seen. The magnifying device is placed over a line of print with the surface 28 lying flat against the line of print to be magnified. When viewed from above, the line of print indicated by the series of X's 30 appears to be magnified in the vertical direction by a substantial amount, though undergoing no significant change in horizontal length. However, as with prior art cylindrical magnifiers, a magnification in vertical direction only yields a substantial improvement in the readability of fine newsprint and the like.

It would seem that the roughened or frosted surface 28 would cause a diffused and unfocused view of the print to be magnified by the device. This, however, is not the case as may be illustrated through FIGS. 4 and 5. FIG. 4 is a schematic representation of light striking a surface, such as a surface containing newsprint, and reflecting therefrom. A light ray 32 strikes the surface 34 at point 36. If the surface is not a polished surface, as is true of paper containing newsprint and the like, the reflected light 38 will have a generally diffused pattern, that is, will be reflected from the surface with components in substantially all directions. Only those components which are directed toward the eye of an observer, either directly or through a magnifying device, contribute to the image sensed by the eye.

FIG. 5 shows schematically the effect of a light ray passing through a frosted surface. Light ray 40 impinges frosted surface 42 at point 44 and, as a result of the frosting, emerges from the other side of surface 42 in a diffused pattern having components 46 projecting in all directions. Thus, the diffused light pattern caused by the frosted surface 42 is substantially the same as the reflected light pattern from a non-polished surface 34 as shown in FIG. 5, the pattern of the reflected light is not significantly changed. In fact, to the extent that the frosted surface is coincident with the surface containing the newsprint or like matter to be magnified, the frosted surface is not observable as such but appears, if at all, as additional texture on the surface containing the print being magnified and tends to reduce the harsh reflections from glossy paper. On the other hand, if the magnifying device is held slightly above the surface containing the matter to be magnified, the diffusion caused by the roughened surface is no longer coincident with the diffusion inherent in the reflected light from a non-polished surface. Consequently, the print is no longer in focus and the roughened surface is observable as such when viewed through the magnifying device.

Since the optical qualities of the magnifying device of the present invention depend upon the roughened surface being substantially coincident with the surface containing the material to be magnified, it is important that the extent of surface roughening is not too extreme, that is, that the surface be free of excessively deep groove scratches, etc. However, a significant roughening does not substantially affect the optical qualities of the magnifying device and the flattened surface may be left in the as cut condition, (without polishing) provided the cutting means is not excessively coarse. This allows cutting the magnifying devices of the present invention from a solid rod of transparent material such as lucite, and flattening the rod by taking a suitable cut therein without requiring time consuming polishing of the cut surface.

The magnifying device of FIG. 1 with the roughened surface 28 thereon has certain advantages over prior art magnifying devices wherein surfaces corresponding to surface 28 were polished surfaces. Since the magnifying device is almost always resting on the flattened surface and is slid along paper containing the print to be magnified, along desk tops, etc., the flattened surface has a tendency to become scratched in a random and unsightly manner. This detracts from the physical appearance of the magnifying devices which, by their nature, are often left in observable positions on desk tops and the like. With the magnifying devices of the present invention, however, the flattened surface is also a roughened surface so that minor scratches and the like blend into the already roughened surface and are generally not readily observable. Therefore, in addition to the reduction in the fabrication costs due to the fact that the flattened surface need not be polished, there is a further advantage in that wear and scratches, etc., do not detract from the physical appearance of the magnifying device.

Now referring to FIG. 2 an alternate embodiment of the present invention may be seen. In this embodiment, the magnifying device is characterized by a first cylindrical surface 50, a second cylindrical surface 52, a third cylindrical surface 54, all of which are portions of the same cylindrical surface, flattened regions 56, 58 and 60, all of which have roughened surfaces, and end surfaces 62 and 64. When surface 56 is placed on printed material to be magnified and the material is viewed through cylindrical surface 50, the magnification is achieved as heretofore described for the embodiment of FIG. 1.

The embodiment of FIG. 2 may also be used in the manner illustrated in FIGS. 7 and 8. FIG. 7 is a view of the magnifying device of FIG. 1 on a sheet of print, and FIG. 8 is a view taken along lines 8—8 of FIG. 7. The magnifying device rests on flattened surface 58 on the sheet of printed material 66, with the print to be magnified generally located just behind the magnifying device in he region generally indicated by the numeral 68. The print to be magnified is viewed from a direction generally indicated by line 70 through cylindrical surface 50 and cylindrical surface 52. Thus, in this use of the embodiment of FIG. 2, viewing of the printed matter to be magnified is accomplished through two of the cylindrical surfaces, both of which are smooth surfaces. Consequently, surfaces 58 and 60, which do not serve as viewing surfaces, may be roughened to a greater extent than may surface 56. The roughened surfaces 58 and 60 also provide convenient means for handling the inventors magnifying device since normal fingerprints and smudges will not substantially affect the roughened surfaces 58 and 60 for the reason previously discussed. The use of the magnifying device 48, as illustrated in FIGS. 7 and 8, allows the viewing of the magnified printed matter from an angle substantially greater than that of the magnifying device of FIG. 1.

Now referring to FIG. 3, a variation in the embodiment of FIG. 1 may be seen. In this figure, opaque decorative side pieces 70 are attached to the cylindrical surface 22. These side pieces, which may be plastic pieces having a decorative pattern thereon, or as an alternate, may simply be a pattern cut into the side of the magnifying device, serve a number of purposes. In addition to being decorative in nature, they also provide convenient gripping surfaces for holding the magnifying device, and being opaque, do not show dirt and scratches resulting from holding the magnifier. Also, the side pieces curve around part of the top half of the magnifying device so as to restrict vision in this area and to prevent the observation of a distorted view of the print in this area when viewed from directly above the magnifying device.

In the preferred embodiment, the magnifying device is fabricated from lucite bars, with two ends 24 and 26 (FIGS. 1 and 9) and 62 and 64 (FIG. 2) being cut at an angle so that the frosted surface is the longest surface on the device. Thus, when viewing the magnifying device from above as shown in FIG. 6, the flat ends are generally not observable. Also, it should be noted that the basic concept of frosting the surface adjacent the material to be magnified is applicable to all magnifying devices, such as, by way of example, to magnifying devices having a spherical upper surface thereon. Such a magnifying device is shown in FIG. 10. This device has a substantially flat bottom surface 80 which is frosted as hereinbefore described and an upper substantially spherical surface 82. Also, in the embodiment shown the device has flattened sides 84 to enhance its appearance and more readily facilitate handling. A further alternate embodiment is shown in FIG. 11. In this embodiment, a cylindrical member 90 having a flattened, roughened lower surface 92 is coupled to and used in conjunction with a second magnifying device 94 thereabove having a square base and a spherical upper surface. This combination provides two dimensional magnification, with the magnification parallel to the axis of cylindrical member 90 being substantially less than the magnification perpendicular to the axis. Cylindrical member 90 is preferably attached to magnifying device 94 by arm 96 so as to be rotatable to a position allowing the separate use of magnifying device 94 if desired.

Also a hair line indicator A can be added to the embodiments shown in FIG. 1—3 to serve as a guide or reference in reading lines of print or when using the magnifying device with a list of written indicia (e.g., a telephone directory). A modified form of hair line indicator B is shown in the embodiments of FIGS. 10 and 11 where the hair line indicator is in the form of a T which provides both horizontal and vertical guides on the magnifying device. Also, the junction of the hair line indicator is useful in certain applications such as in reading maps and the like.

Thus, while the invention has been particularly shown and described with reference to preferred embodiments thereof, it will be understood by those skilled in the art that various changes in form and detail may be made therein without departing from the spirit and scope of the invention.

I claim:

1. A magnifying device comprising a transparent member having first, second and third surfaces defining a portion of a cylinder, fourth, fifth and sixth substantially flat surfaces substantially parallel to the axis of said cylinder, and first and second ends, said fourth surface being a roughened surface so as to diffuse light passing therethrough, said fifth surface being separated from said fourth surface by said first surface, said sixth surface being separated from said fourth surface by said second surface, said fifth and sixth surfaces being separated from each other by said third surface, said fourth, fifth and sixth surfaces each truncating said cylinder by a circular segment having a circular arc of substantially less than 180°.

2. The magnifying device of claim 1 wherein said fifth and sixth surfaces are roughened surfaces.

3. The magnifying device of claim 1 wherein said first and second ends are inclined toward each other so that said fourth surface is the longest surface on said magnifying device.

4. A magnifying device comprising:
substantially transparent first and second members and a connecting member;
said first member having a substantially flat lower first surface, a substantially spherical second surface convex upward and disposed above said first surface, and third, fourth, fifth and sixth side surfaces generally perpendicular to said first surface and extending between said first and second surfaces, said third surface being generally perpendicular to said fourth and fifth surfaces and parallel to and spaced apart from said sixth surface;
said second member being a generally elongate cylindrical member;

said connecting member being mechanically and rotationally coupled to said third surface of said first member and mechanically coupled to said second member so that said second member is rotatably disposable against said first surface of said first member and generally parallel to said fourth and fifth sides thereof.

5. The magnifying device of claim 4 wherein said second member has a substantially flat surface adapted to diffuse light passing therethrough and disposed parallel to the airs of said generally cylindrical surface thereof, said substantially flat surface of said second member being disposable against material to be magnified when said second member is disposed against said first surface of said first member.

* * * * *